United States Patent [19]

Kubach

[11] Patent Number: 4,520,779

[45] Date of Patent: Jun. 4, 1985

[54] REGULATING DEVICE FOR THE SIGNAL OF AN ELECTROMAGNETIC CONTROL ELEMENT

[75] Inventor: Hans Kubach, Korntal-Münchingen, Fed. Rep. of Germany

[73] Assignee: Robert Bosch GmbH, Stuttgart, Fed. Rep. of Germany

[21] Appl. No.: 570,442

[22] Filed: Jan. 16, 1984

Related U.S. Application Data

[63] Continuation of Ser. No. 320,998, Nov. 13, 1981, abandoned.

[30] Foreign Application Priority Data

Nov. 14, 1980 [DE] Fed. Rep. of Germany ....... 3042917

[51] Int. Cl.$^3$ ............................ F02D 5/00; G05D 3/00
[52] U.S. Cl. ..................................... 123/357; 123/352
[58] Field of Search ............... 123/352, 357, 358, 359, 123/440

[56] References Cited

U.S. PATENT DOCUMENTS

| | | | |
|---|---|---|---|
| 3,533,236 | 10/1970 | Cottington | 123/352 X |
| 3,716,035 | 2/1973 | Adler et al. | 123/357 |
| 3,722,485 | 3/1973 | Ohtani | 123/357 |
| 3,757,750 | 9/1973 | Ohtani | 123/357 |
| 4,056,157 | 11/1977 | Kawata | 123/352 X |
| 4,242,995 | 1/1981 | Schramm et al. | 123/352 X |
| 4,350,130 | 9/1982 | Shulman | 123/440 |
| 4,359,984 | 11/1982 | Nakao | 123/357 |

Primary Examiner—Parshotam S. Lall
Assistant Examiner—W. R. Wolfe
Attorney, Agent, or Firm—Edwin E. Greigg

[57] ABSTRACT

A regulating device for controlling the position of an electromagnetic final control element, in particular in an internal combustion engine having self-ignition. The device includes a measurement value receptor as well as at least one regulating circuit having a non-linear characteristic which is influenced by its output and/or input signal. In addition to a proportional component, the non-linear regulating circuit may include an integration component and a differentiation component. The setting of at least the proportional component is varied, preferably in accordance with the deviation, so that in particular small deviations of the output and/or input signal are amplified to a greater extent than are larger deviations. In this manner, an extremely sensitive and precise regulation is attained.

8 Claims, 4 Drawing Figures

REGULATING DEVICE FOR THE SIGNAL OF AN ELECTROMAGNETIC CONTROL ELEMENT

This is a continuation of copending application Ser. No. 320,998 filed Nov. 13, 1981 now abandoned.

BACKGROUND OF THE INVENTION

The invention relates generally to apparatus for regulating the position of an electromagnetic control element and, more particularly, to a device for regulating the position of an electromagnetic control element in an internal combustion engine.

In a specific type of internal combustion engine having self-ignition, the quantitiy of fuel to be injected is set by means of the position of a regulating rod. It is known to ascertain the position of the regulating rod by means of a measurement value receptor and to set a specific value thereby. This purpose is served by a PID regulator, with which deviations from set-point and actual values are stabilized in both the static and the dynamic range.

In view of ever stricter demands for precision in fuel metering, the known regulators have proved not to be optimal in performance, especially when it is important to stabilize comparatively small deviations.

OBJECT AND SUMMARY OF THE INVENTION

The regulating devices described herein include a measurement value receptor similar to those of known regulators described above and a regulating circuit having a non-linear characteristic which is influenced by at least one of the input and output signals of the regulating circuit. The non-linear regulating circuit may include proportional, integrating and differentiating circuits similar to those of known PID regulators, and threshold circuitry associated with the non-linear regulating circuit to attain a greater amplification, especially of the proportional circuit, when there are small deviations of input and/or output signals than when there are large signal deviations. The non-linear regulating circuit may also include theshold circuitry for selecting the differentiation time constant of the differentiating circuit, and for controlling the integration constant of the integrating circuit, in accordance with the signal deviation.

With the regulating device according to the invention, even very small deviations can be reliably controlled, which produces extemely precise results. It has been demonstrated that the field in which the invention can be applied is basically unlimited; the invention can be used wherever a comparison must be made between set-point and actual values and the deviation thus found reduced to zero. The invention is particularly suitable for regulating the position of hydraulic valves of any arbitrary type.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
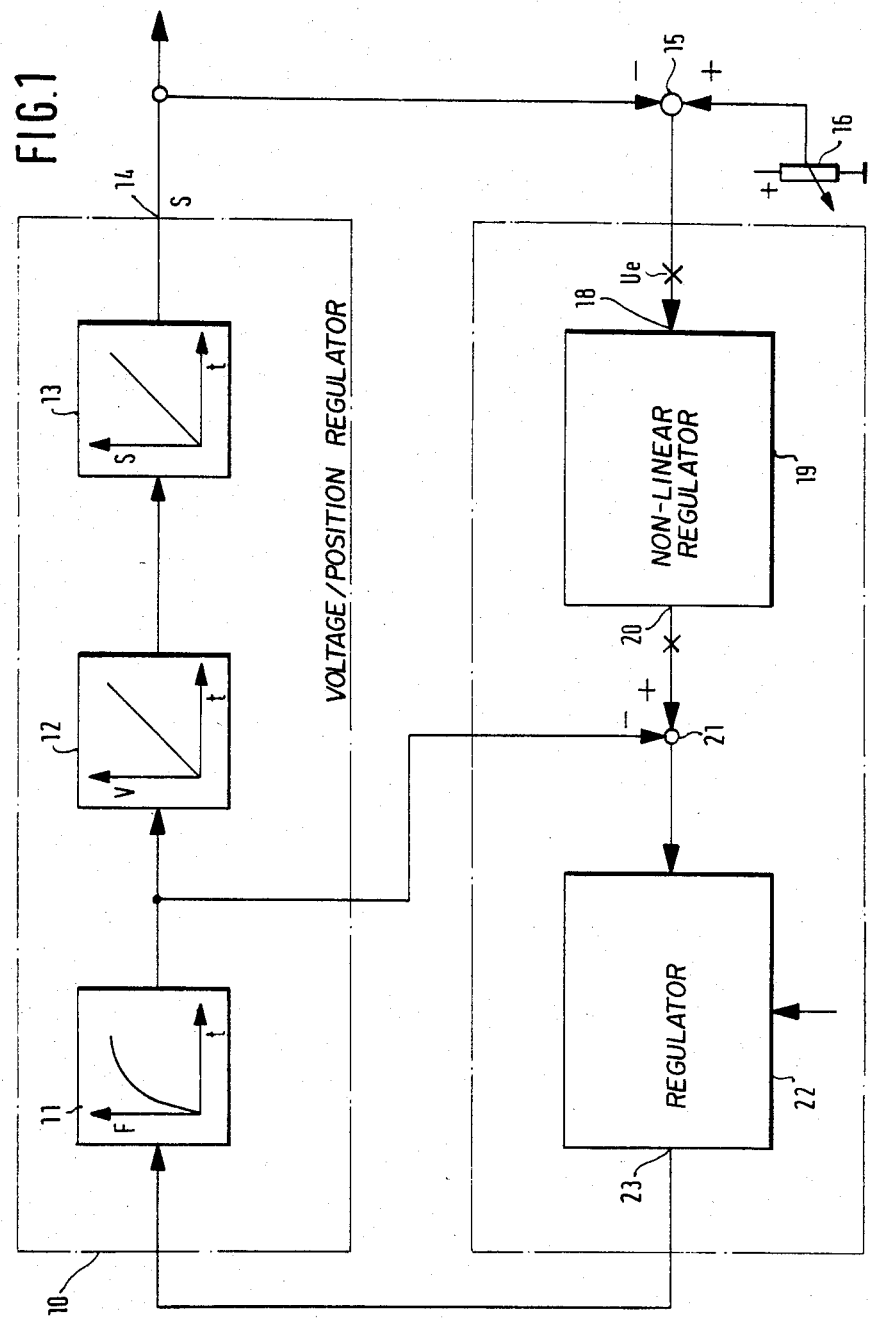
FIG. 1 shows a regulator for the position of the regulating rod of an internal combustion engine having self-ignition.

FIG. 1, in the form of a schematic block circuit diagram, shows a position regulator for a regulating rod in an internal combustion engine having self-ignition. A voltage/position converter 10 is subdivided into three blocks 11, 12 and 13. These stand for the various individual physical processes in the conversion of voltage into travel distance (interpreted as position). In block 11, the course of the force F is plotted over time t, and thus substantially corresponds to the flowing electric current. As a result of the applied force F, movement occurs which is expressed in a velocity V plotted in block 12. The result of this, in turn, is a positional displacement entered in block 13. A positional signal s can be picked up at the output 14 of the voltage/position converter 10, and this signal s proceeds to a set-point/actual-value comparison point 15. The set point, by way of example, is established here by means of a potentiometer 16. The comparison signal Ue from the comparison point 15 proceeds via an input terminal 18 to a non-linear regulator 19 having an output terminal 20. The output signal of the non-linear regulator 19 is a set-point value for electric current, which is picked up in a subsequent comparison circuit 21 together with an actual value from the output of block 11 in the voltage/position converter 10. The desired set point for electric current is stabilized in a known subsequent regulator 22 and converted into a voltage at the output 23. The important feature here is that in the subject of FIG. 1, the regulator 19 exhibits a non-linear characteristic.

Figure 2:
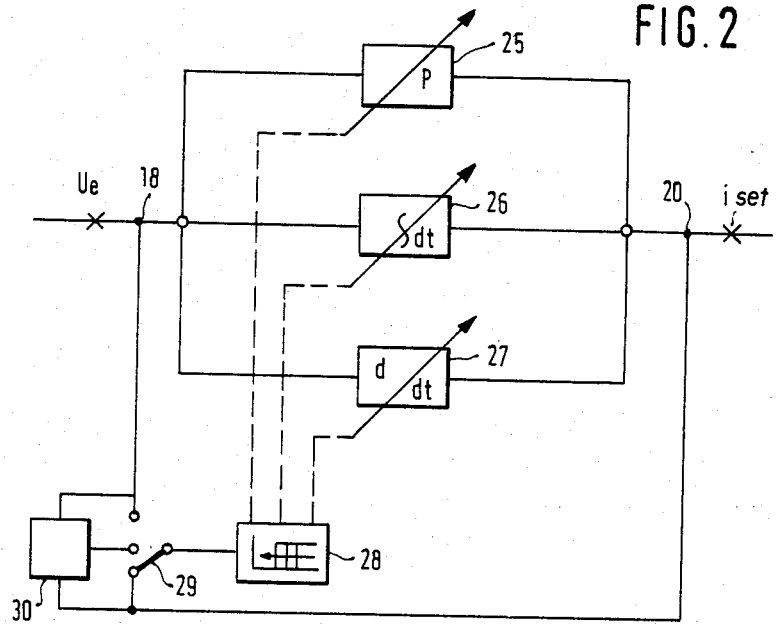
FIG. 2 shows a detail of the regulator of FIG. 1 in the form of an enlarged block circuit diagram.

One possible realization of such a regulator type is shown schematically in FIG. 2. It substantially comprises three regulator blocks 25, 26 and 27 disposed in parallel, intended respectively for proportional (P), integrating (I) and differentiating (D) transmission functions.

All three blocks 25–27 have arrows intended to indicate the adjustable nature of their characteristic. These arrows originate in a threshold circuit 28, the input variable of which is oriented, depending upon the position of the switch 29, toward the signals of input 18, output 20, or a selectable linkage of these two variables in a separate circuit 30. By means of the device shown in FIG. 2, it is possible to establish a setting of the P, I or D components 25, 26, or 27 which is dependent on input signals of the threshold circuit 28. Furthermore, arbitrary opportunities for varying the individual setting elements are provided, depending on the manner of signal linkage in the threshold circuit 28. In particular, the intention is to attain a greater amplification, especially of the P member 25, when there are small deviations than when there are large deviations. It becomes clear that the non-linearity in the subject of FIG. 1 or of FIG. 2 pertains not to absolute values such as that for the position of the regulating rods but rather only to the deviation at a particular time.

The individual regulating circuits 25, 26 and 27 are also known in terms of basic structure, as is the threshold circuit 28. Their respective parameters should be selected in terms of individual cases and therefore can hardly be specified in final form.

Figure 3:
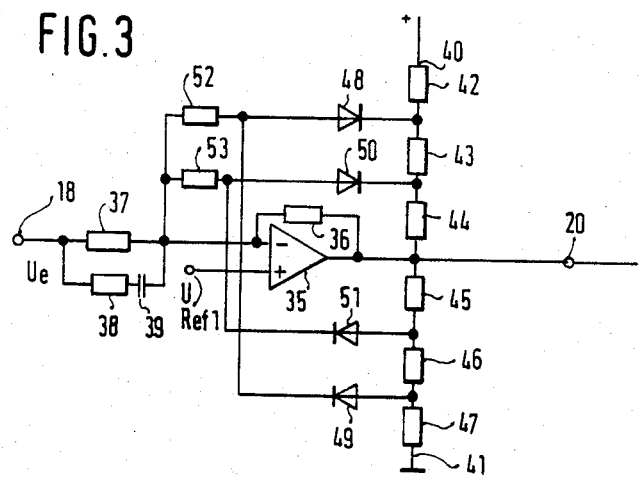
FIG. 3 shows one exemplary embodiment of a non-linear PD regulator such as may be used in the subject of FIG. 2.

One example of a non-linear PD regulator having a non-linear characteristic is shown in FIG. 3. There, the separately indicated blocks 25, 26 and 28 of FIG. 2 are basically realized as a single circuit. This circuit comprises an amplifier 35, switched in known fashion, having a feedback resistor 36 and a preceding resistor-capacitor combination 37, 38 and 39. A 5-circuit voltage divider is also located between two operational voltage terminals 40 and 41 having six resistors 42–47. The middle connecting point (that is, the connecting point between the two resistors 44 and 45) is coupled directly to the output 20 of the non-linear regulator, while from each of the other connecting points one of the diodes 48–51, disposed symmetrically with respect to the output 20, leads via two resistors 52 and 53 to the negative input of the amplifier 35.

Depending on the input signal as compared with a divider signal at the 5-circuit voltage divider, either one or two of the diodes become conductive and thus determine the output signal at the terminal point 20. In this manner, the desired non-linearity is attained in terms of the kind of regulation described above.

Figure 4:
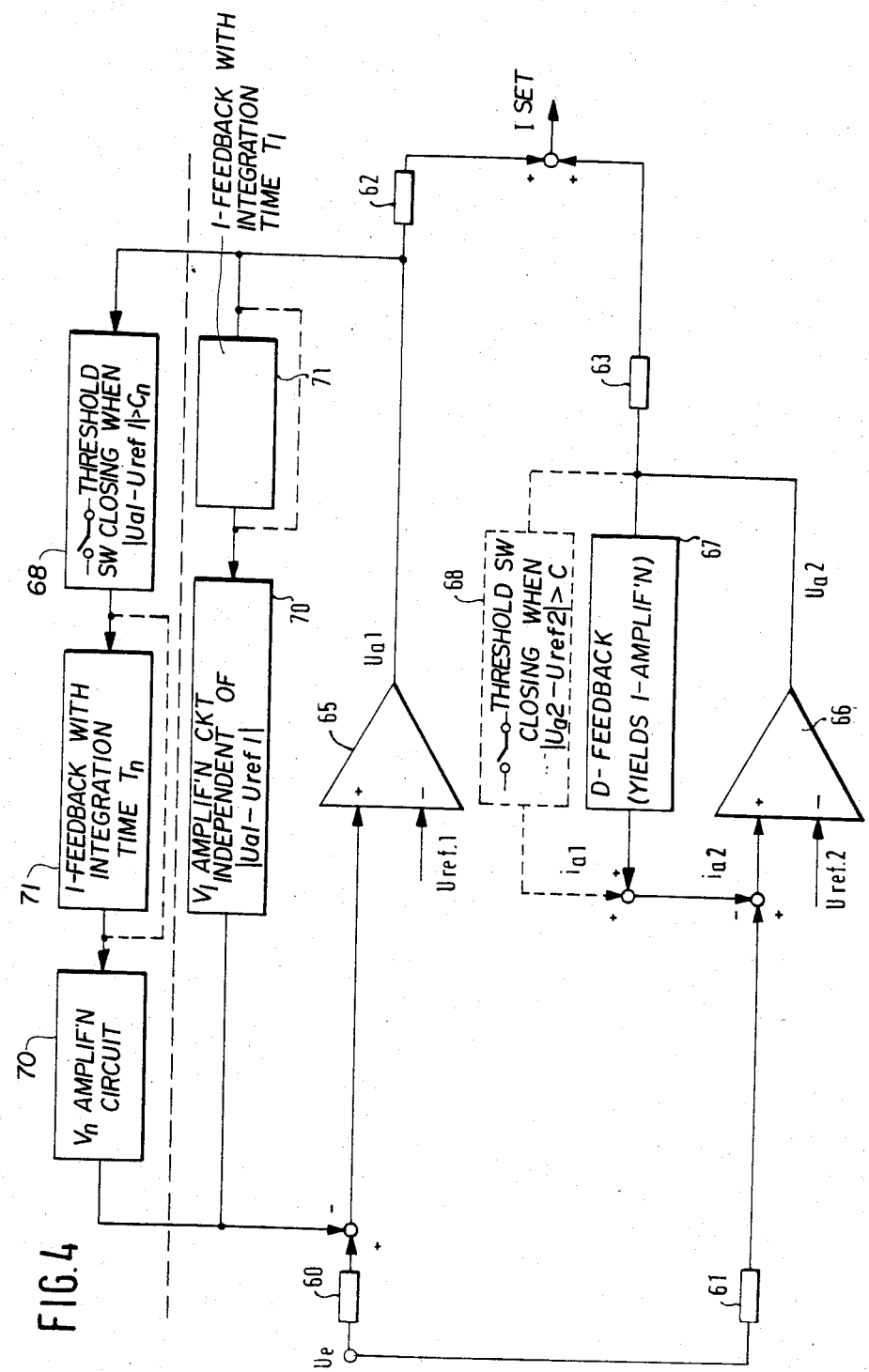
FIG. 4 shows a further exemplary embodiment.

FIG. 4 illustrates the novel principle of the non-linear regulator in terms of a further exemplary embodiment. The non-linear amplification pertains to the deviation rather than to the constant, or relatively slowly varying, data of the regulatory circuit. The outputs $U_{a1}$ and $U_{a2}$ of the two amplifiers 65, 66 are added to form the output signal $I_{set}$ via evaluating resistors 62 and 63. The non-linearity with n course-changing points, given the amount $U_{a1} - U_{Ref1} > Cn$, is substantially contained in an amplifier 65; its stationary deviation $U_{a1} - U_{Ref1}$ is zero, because a second amplifier 66 having integral behavior causes stationary deviations to become zero. Accordingly, at low frequencies the lower amplifier 66 has much greater amplification capacity than does the upper amplifier 65. The lower amplifier 66 can also, parallel to the D feedback 67 (which yields integral behavior), have an amplification limitation threshold switch 68, so as not to receive any delays caused by overmodulation in the presence of modulations $U_{a2} - U_{ref2} > C$.

In series with the non-linear feedbacks 70 $V_1 \ldots V_{n'}$ there may be integrators 71 having time constants $T_1 - T_n$, which generate different differentiation time constants D ($U_{a1} \sim T_d\, U_e/dt$) depending on the deviation. Thus it is possible to adapt, for instance, to the various time constants characteristic of the electric current.

Networks may be switched parallel to the input resistors 60 and 61; in the lower amplifier 66, this produces D behavior and in the upper amplifier 65, it produces D ($D_2$ with I feedback) behavior.

Thus, at each stationary working point $U_{a2}(t) \approx \text{const}$, the dynamic (time) behavior is substantially modulated by $U_{a1}$ with a P (D) behavior which, at the middle point $U_{a1} - U_{ref1}$, is non-linear.

What is essential in the subject of the invention is that subdividing the regulator into a linear I (PID) regulator and a non-linear P (PD, $PD_2$) regulator, a non-linear regulating characteristic is attained in accordance with the respective deviation. By means of this non-linearity, an increased amplification is attained in the case of small deviations from one working point of the P member than in the case of large deviations.

The foregoing relates to preferred exemplary embodiments of the invention, it being understoood that other embodiments and variants thereof are possible within the spirit and scope of the invention, the latter being defined by the appended claims.

What is claimed and desired to be secured by Letters Patent of the United States is:

1. A regulating device for controlling the position of an electromagnetic control element according to a set point value, comprising a sensor for sensing an actual position value and at least one regulating loop circuit including a set-point/actual-value comparison means and a regulator having at least one of a control characteristic P, I and D, and said at least one characteristic being responsive to at least one of an output signal from and an input signal to said regulator.

2. A regulating device as defined by claim 1, wherein the non-linear regulator comprises a proportional regulator and means for providing a greater amplification by the proportional regulator when there are small deviations in said at least one of the signals than when there are large deviations.

3. A regulating device as defined by claim 1, wherein the non-linear regulator comprises a differential regulator and means for selecting the time constant of the differentiation by the differential regulator in accordance with the deviation of said at least one of two signals.

4. A regulating device as defined by claim 1 wherein said output signal from said regulator pertaining to position is processed as the regulator variable for said regulating device.

5. A regulating device as defined by claim 1, wherein the non-linear regulator comprises an integral regulator and means for controlling the integration constant of the integral regulator in accordance with the deviation of said at least one of said signals.

6. A regulating device as defined by claim 1, wherein the electromagnetic control element is a final control element in an internal combustion engine with self-ignition.

7. A regulating device as defined by claim 1 wherein said output signal from said regulating device pertains to rpm or load and is processed as the regulatory variable for said regulating device.

8. A regulating device as defined by one of the claims 1, 2 or 3, wherein the non-linear regulator comprises at least one threshold switch for controlling said non-linear charcteristic.

* * * * *